(12) United States Patent
Horie et al.

(10) Patent No.: US 11,415,589 B2
(45) Date of Patent: Aug. 16, 2022

(54) AUTOMATIC ANALYZER

(71) Applicant: Hitachi High-Tech Corporation, Tokyo (JP)

(72) Inventors: Yosuke Horie, Tokyo (JP); Yasuhiro Yoshimura, Tokyo (JP); Atsushi Kazama, Tokyo (JP); Masato Ishizawa, Tokyo (JP); Satoru Yamamoto, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 176 days.

(21) Appl. No.: 16/971,213

(22) PCT Filed: Dec. 26, 2018

(86) PCT No.: PCT/JP2018/047705
§ 371 (c)(1),
(2) Date: Aug. 19, 2020

(87) PCT Pub. No.: WO2019/176227
PCT Pub. Date: Sep. 19, 2019

(65) Prior Publication Data
US 2021/0096148 A1  Apr. 1, 2021

(30) Foreign Application Priority Data

Mar. 14, 2018  (JP) .............................. JP2018-046613

(51) Int. Cl.
*G01N 35/10* (2006.01)
*G01F 23/296* (2022.01)
(Continued)

(52) U.S. Cl.
CPC ..... *G01N 35/1009* (2013.01); *G01F 23/2961* (2013.01); *G01F 23/2962* (2013.01);
(Continued)

(58) Field of Classification Search
CPC ............ G01N 35/1009; G01F 23/2961; G01F 23/2962
(Continued)

(56) References Cited

U.S. PATENT DOCUMENTS

| 5,705,750 A | 1/1998 | Mizukami et al. |
| 2006/0236766 A1 | 10/2006 | Quirch et al. |
| 2009/0133511 A1 | 5/2009 | Heinze et al. |

FOREIGN PATENT DOCUMENTS

| EP | 0 979 998 A2 | 2/2000 |
| JP | 9-5141 A | 1/1997 |

(Continued)

OTHER PUBLICATIONS

English translation for JP2016186429 description accessed from espacenet.com.*

(Continued)

*Primary Examiner* — Nimeshkumar D Patel
*Assistant Examiner* — Jean F Morello
(74) *Attorney, Agent, or Firm* — Crowell & Moring LLP

(57) ABSTRACT

Provided is an automatic analyzer provided with a liquid level sensing function in which liquid levels in sample containers having various heights can be precisely detected using ultrasonic waves. This device is provided with: a conveyance rack for conveying a sample container which contains a sample and is loaded thereon; a fixed ultrasonic distance sensor for measuring the liquid level position in the sample container loaded on the conveyance rack; sound wave guides for suppressing diffusion of sound waves transmitted from the ultrasonic distance sensor, the sound wave guides being disposed between the sample container and the ultrasonic distance sensor; and a sound wave guide control unit for adjusting the length or switching the length of the sound wave guides in accordance with the distance (Continued)

between the ultrasonic distance sensor and the sample container.

12 Claims, 10 Drawing Sheets

(51) Int. Cl.
*G01F 23/2962* (2022.01)
*G01S 15/88* (2006.01)

(52) U.S. Cl.
CPC ............ *G01N 2035/1025* (2013.01); *G01N 2291/02836* (2013.01); *G01S 15/88* (2013.01)

(58) Field of Classification Search
USPC ........................................ 73/290 v
See application file for complete search history.

(56) References Cited

FOREIGN PATENT DOCUMENTS

| JP | 9-127137 A | 5/1997 |
|---|---|---|
| JP | 9-184716 A | 7/1997 |
| JP | 2000-321289 A | 11/2000 |
| JP | 2001-74753 A | 3/2001 |
| JP | 2011-22041 A | 2/2011 |
| JP | 4791489 B2 | 10/2011 |
| JP | 2015-87265 A | 5/2015 |
| JP | 2015-175795 A | 10/2015 |
| JP | 2016-186429 A | 10/2016 |

OTHER PUBLICATIONS

English translation for JPH09127137 description accessed from espacenet.com.*
English translation for JP2000321289 description accessed from espacenet.com.*
International Search Report (PCT/ISA/210) issued in PCT Application No. PCT/JP2018/047705 dated Mar. 26, 2019 with English translation (four (4) pages).
Japanese-language Written Opinion (PCT/ISA/237) issued in PCT Application No. PCT/JP2018/047705 dated Mar. 26, 2019 (four (4) pages).
Extended European Search Report issued in European Application No. 18909659.7 dated Nov. 9, 2021 (11 pages).

* cited by examiner (a)

(b)

AUTOMATIC ANALYZER

TECHNICAL FIELD

The present invention relates to an automatic analyzer having a function of measuring in a non-contact manner the liquid level position of a sample in a sample container.

BACKGROUND ART

In an automatic analyzer, in order to analyze a sample such as blood, a sample container such as a blood collection tube or a sample cup containing the sample is input to the analyzer. In the analyzer, the sample in each container is dispensed (processing of dividing into a predetermined amount) and mixed with a reagent, and whereby component analysis is performed. An elongated nozzle is used for dispensation, and the liquid level position of the sample is detected by a capacitive sensor as disclosed in PTL 1 for dispense with high precision. However, the capacitive sensor may include an error in sensing depending on the surrounding charged state such as a blood collection tube and a sample cup. In addition, the liquid level position is only sensed at the timing when the nozzle approaches the liquid level, thereby performing a lowering control so as to stop the nozzle suddenly. Therefore, a sensing method capable of sensing the liquid level in a non-contact manner has been studied. As a non-contact liquid level sensing method using laser beam, a method using ultrasonic waves as in PTL 2 has been developed, because a change in reflectance affects measurement precision for liquids such as blood having different colors and implementation cost to the analyzer is high.

CITATION LIST

Patent Literature
  PTL 1: JP 2011-22041 A
  PTL 2: JP H9-5141 A

SUMMARY OF INVENTION

Technical Problem

In ultrasonic distance measurement, a distance is calculated from the time until the sound wave transmitted from the piezoelectric element in the ultrasonic distance sensor is reflected at the liquid level and returns. A blood collection tube, as an example, has an inner diameter of about 10 mm, and when an ultrasonic distance sensor is placed above the blood collection tube to detect the liquid level, the sound wave is highly likely to return first from the upper edge of the blood collection tube. In addition, in the surrounding, there is something that is likely to reflect sound waves other than the liquid level, such as the edge and side surface of an adjacent blood collection tube and the top surface of a conveyance rack on which the blood collection tube is loaded. There is a method of attaching a horn to focus sound waves and increase directivity when measuring the distance to a target object in a desired range with an ultrasonic distance sensor. In addition, it is also possible to provide a dead band in the time from transmission of the sound wave to reception of the reflected wave, and to perform signal processing so as to ignore the reflected wave from a certain range of distance.

However, for automatic blood analyzers, for example, blood collection tubes of various heights from about 50 mm in the shortest to about 100 mm in the longest are used, where the height difference is 50 mm or more. Furthermore, the liquid level height in the blood collection tube varies, for example, the minimum liquid amount in the blood collection tube having a height of 100 mm is about 10 mm from the bottom, and the maximum liquid amount is about 90 mm from the bottom, where the height difference is about 80 mm. In order to measure the liquid level position in the tube under the condition having a height difference between the blood collection tubes, it is necessary to fix the sensor to the longest blood collection tube. However, if the sensor is fixed to the longest blood collection tube, the distance between the sensor and the blood collection tube is 50 mm or more in measurement of the shortest blood collection tube, and hence the sound waves diffuse even when the horn is attached. It is also possible to shorten the distance between the horn and the blood collection tube by moving vertically the sensor itself. However, if the sensor itself moves, the positioning error of the sensor is included in the measurement error, and hence it is not suitable for measurement requiring precision.

In addition, even if a dead band is provided in signal processing, the range of the liquid level whose position is unknown is wide, and hence the distance to the surrounding blood collection tube and the conveyance rack from which the signal should be removed and the range of the liquid level to be measured may overlap together, thereby making it difficult to set. In a case where the signal level (voltage) of the reflected wave is used to perform signal processing so as to judge whether the reflection is from the liquid level or something else, it is necessary to take into consideration the change in the signal level of the reflected wave due to the inclination of the blood collection tube or the conveyance rack, and hence the system becomes complicated.

The present invention provides an automatic analyzer provided with a liquid level sensing function whereby the liquid level position in sample containers having various heights can be precisely measured using ultrasonic waves.
Solution to Problem The automatic analyzer of the present invention is provided with: a conveyance rack for conveying a sample container which contains a sample and is loaded thereon; a fixed ultrasonic distance sensor for measuring the liquid level position in the sample container loaded on the conveyance rack; sound wave guides for suppressing diffusion of sound waves transmitted from the ultrasonic distance sensor, the sound wave guides being disposed between the sample container and the ultrasonic distance sensor; and a sound wave guide control unit for adjusting the length or switching the length of the sound wave guides in accordance with the distance between the ultrasonic distance sensor and the sample container.
Advantageous Effects of Invention The liquid level position in sample containers having various heights can be precisely measured using ultrasonic waves.

Problems, configurations, and effects other than those described above will be made clear in the description of embodiments below.

DESCRIPTION OF EMBODIMENTS

Embodiments of the present invention are hereinafter described with reference to the drawings. The automatic analyzer targeted by the present invention analyzes a biological sample such as blood and urine. An embodiment of the present invention is hereinafter described with an example of an automatic blood analyzer using blood as a biological sample and a blood collection tube as a sample container. However, this is merely an example, and is not intended to limit the present invention to an automatic blood analyzer.

FIG. 1 is a schematic view illustrating a configuration example of an automatic blood analyzer. FIG. 1(a) is a schematic top view of the analyzer, FIG. 1(b) is a schematic view of a reagent dispensation mechanism 14, FIG. 1(c) is a schematic view of a sample dispensation mechanism 15, and FIG. 1(d) is a schematic view of a blood collection tube 21 loaded on a conveyance rack 22.

Figure 1A:
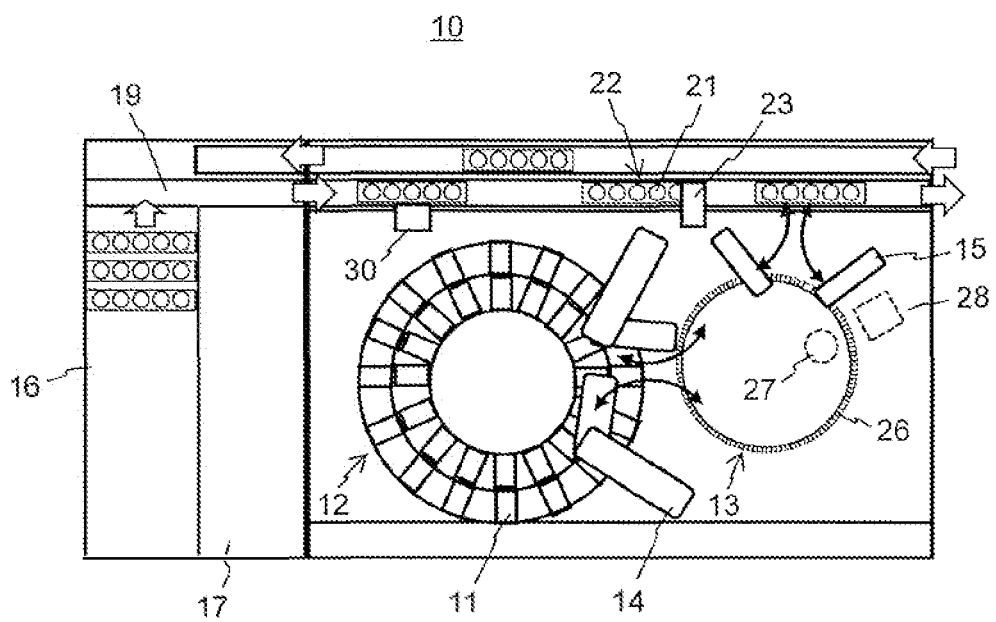
FIGS. 1A to 1D are schematic views illustrating a configuration example of an automatic blood analyzer.
Figure 1B:
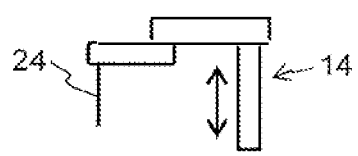
Figure 1C:
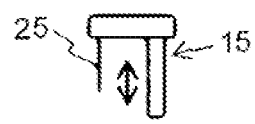
Figure 1D:
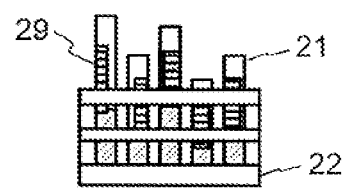

An automatic blood analyzer 10 of the present embodiment has a reagent disk 12 on which a plurality of reagent containers 11 are mounted, a reaction disk 13 on which a plurality of reaction cells 26 are installed, a reagent dispensation mechanism 14, a sample dispensation mechanism 15, a conveyance rack 22 on which a blood collection tube 21 as a sample container is loaded and conveyed, an input line 16 on which the conveyance rack 22 is input to the analyzer, a pickup line 17 on which the conveyance rack 22 is picked up, a conveyance line 19 on which the conveyance rack 22 is conveyed, a bar code reader 30 for reading a bar code 29 affixed to the blood collection tube 21, and a liquid level sensing mechanism for measuring the liquid level position in the blood collection tube 21 on the conveyance line 19. The reagent dispensation mechanism 14 includes a nozzle 24 for dispensing a reagent as illustrated in FIG. 1(b), and sucks the reagent from the reagent container 11 and discharges it to the reaction cell 26. The sample dispensation mechanism 15 includes a nozzle 25 for dispensing a sample as illustrated in FIG. 1(c), and sucks the blood sample from the blood collection tube 21 and discharges it to the reaction cell 26. The nozzle 25 is vertically movable by an arm of the sample dispensation mechanism 15. As illustrated in FIG. 1(d), the conveyance rack 22 is mounted with and conveys a plurality of blood collection tubes 21 containing samples. The bar code 29 recording an ID for identifying each blood collection tube is affixed to the blood collection tube 21. It is to be noted that the sample is a sample derived from blood such as serum or whole blood.

The reaction cell 26 installed in the reaction disk 13 is a transparent container, and the reaction level between the sample and the reagent that are discharged into the reaction cell 26 is measured as an absorbance by a lamp 27 and an absorbance meter 28 disposed across the reaction cell 26. Furthermore, information of the bar code 29 affixed to the blood collection tube 21 is read by the bar code reader 30 on the conveyance line at the time of conveyance, and is used for judgement of inspection items for each blood collection tube 21. It is to be noted that the automatic analyzer includes operation units for operating the analyzer such as a PC and a control board, which are not illustrated in FIG. 1.

The sample dispensation mechanism 15 moves the nozzle 25 for sample by the rotation motion of the arm from a suction position where the sample is sucked from the blood collection tube 21 loaded on the conveyance rack 22 to a discharge position where the sample is discharged to the reaction cell of the reaction disk 13. Furthermore, the sample dispensation mechanism 15 lowers the nozzle 25 in accordance with the height of the blood collection tube 21 and the reaction disk 13 at the suction position and the discharge position. The nozzle 25 incorporates therein a known capacitive sensor, and contact of the nozzle 25 with the liquid level in the blood collection tube 21 can be sensed by monitoring the capacitance changing as the tip of the nozzle 25 approaches the liquid level in the blood collection tube 21. Here, the nozzle 25 of the sample dispensation mechanism 15 is cleaned for the purpose of preventing contamination after sucking a sample from one blood collection tube 21 and discharging it to the reaction cell 26 before accessing another blood collection tube 21. If the tip of the nozzle 25 is put too deeply into the sample from the liquid level, it takes time for cleaning, thereby resulting in a reduction in the throughput of analysis. Accordingly, it is necessary to reliably measure the liquid level position in the blood collection tube 21 and to control the penetration depth of the nozzle tip into the sample. The conveyance rack 22 is intermittently moved by the conveyance line 19. That is, when at least the nozzle 25 of the sample dispensation mechanism 15 is at the suction position, the conveyance rack 22 on which the blood collection tube is loaded is stopped.

In the present embodiment, the liquid level position in the blood collection tube 21 on the conveyance rack 22 conveyed by the conveyance line 19 is measured by the liquid level sensing mechanism 23 before the dispensation motion by the sample dispensation mechanism 15. Therefore, the liquid level position in the blood collection tube 21 is known before the sample dispensation mechanism 15 lowers the nozzle 25. That is, it is possible not to perform the lowering motion of the nozzle 25 for an unknown liquid level position but to perform it for a known liquid level position. When the lowering motion of the nozzle is controlled by using only the capacitive sensor, it is necessary to stop the nozzle by rapidly decelerating at the timing when the nozzle approaches the liquid level, and the nozzle 25 becomes easily vibrated in the vertical direction. The cause of this vibration includes the falling of the arm holding the nozzle 25 of the sample dispensation mechanism 15 and the deformation of the belt of a belt pulley mechanism for vertically driving the sample dispensation mechanism 15. However, if the liquid level position is known before the nozzle 25 lowers, a deceleration method that reduces the vibration of the nozzle 25 can be selected. The deceleration methods for reducing the vibration include a method in which the vibration frequency in the vertical direction of the nozzle 25 is measured in advance, and the deceleration of the lowering motion of the arm of the sample dispensation mechanism 15 is made to be an integer multiple of the inverse of the vibration frequency. Alternatively, it may be simply stopped so as to suppress the change amount of the acceleration.

Figure 2A:
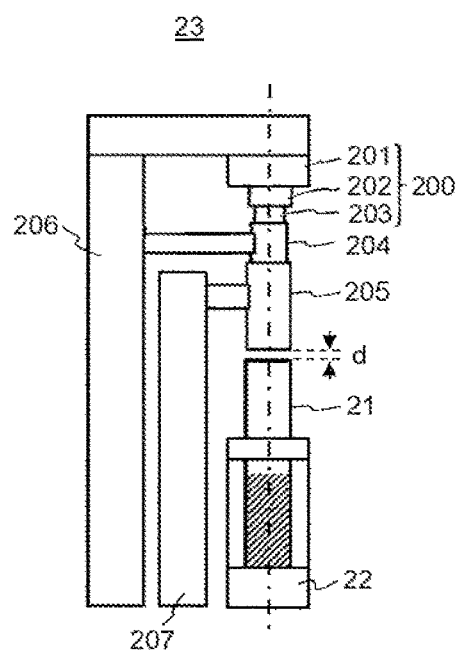
FIGS. 2A to 2C are schematic views illustrating a first embodiment of a liquid level sensing mechanism together with a comparative example.

FIG. 2 is a schematic view illustrating the first embodiment of the liquid level sensing mechanism together with a comparative example. FIGS. 2(a) and 2 (b) are schematic views illustrating a configuration example of a multistage, extendable sound wave guide in the liquid level sensing mechanism 23, and FIG. 1(c) is a schematic view illustrating a comparative example.

An ultrasonic distance sensor 200 used in the liquid level sensing mechanism 23 of the present embodiment includes a signal processing unit 201, an element section 202, and a cylindrical section 203. The signal processing unit 201 includes a circuit that processes the transmission and reception of sound waves by the piezoelectric elements in the element section 202, calculates the distance to the liquid level from the time from transmission to reception of a sound wave, and outputs a voltage corresponding to the distance. Although this circuit can be disposed at a position away from the liquid level sensing mechanism 23, it is desirable to dispose it close to the element section 202 in order to suppress the influence of signal noise. The piezoelectric element in the element section 202 is circular. The cylindrical section 203 is used for connecting the element section 202 with a first sound wave guide 204 described later; however, it is not necessary for the cylindrical section 203 to come into contact with the first sound wave guide 204. In addition, the cylindrical section 203 is unnecessary if the diameter of the element section 202 is smaller than the diameter of the first sound wave guide 204.

The liquid level sensing mechanism 23 of the present embodiment includes an extendable sound wave guide composed of the first sound wave guide 204 and a second sound wave guide 205 that are nested. The first sound wave guide 204, which is positioned above is smaller in diameter than the second sound wave guide 205 positioned below, and is connected and fixed to a base 206 to which the ultrasonic distance sensor 200 is fixed. The first sound wave guide 204 may be fixed to a base other than the one to which the ultrasonic distance sensor is fixed. The second sound wave guide 205 is fixed to a vertical mechanism 207 and is vertically movable. The vertical mechanism 207 can assume a method of driving a belt pulley mechanism by a motor, a method of driving a ball screw by a motor, or a method of moving vertically using a plurality of solenoids having different lengths. The entire length of the sound wave guide can be adjusted by vertically moving the second sound wave guide 205.

In the present embodiment, since the ultrasonic distance sensor 200 is fixed to the base 206 and the relative distance to the blood collection tube 21 does not change, the positioning precision of the vertical mechanism 207 does not affect the detection precision of the liquid level. Therefore, high-precision positioning is not required for the vertical mechanism 207. Accordingly, it is possible to select low-grade, low-cost components and actuators. In addition, since the ultrasonic distance sensor 200 is fixed and only the sound wave guide moves, and a movable section of the sound wave guide and the ultrasonic distance sensor are not brought into contact with each other, it is possible to reduce the influence of a positioning error and vibration noise that are due to position adjustment.

The cylindrical sound wave guide can be made of any material, for example, metal or plastic. A distance d between the second sound wave guide 205 and the blood collection tube 21 is desirably separated in order to prevent components such as blood adhering to the blood collection tube 21 from adhering to the second sound wave guide 205. Although varying depending on the frequency and voltage of the ultrasonic distance sensor 200 used, the liquid level in the blood collection tube 21 can be detected even when the distance d between the second sound wave guide 205 and the blood collection tube 21 is separated by about 5 mm. Of course, if the outer diameter of the second sound wave guide 205 is smaller than the inner diameter of the blood collection tube 21 and a contact-free control is possible, it is possible to sense the liquid level by inserting the second sound wave guide 205 into the blood collection tube 21.

Figure 2B:
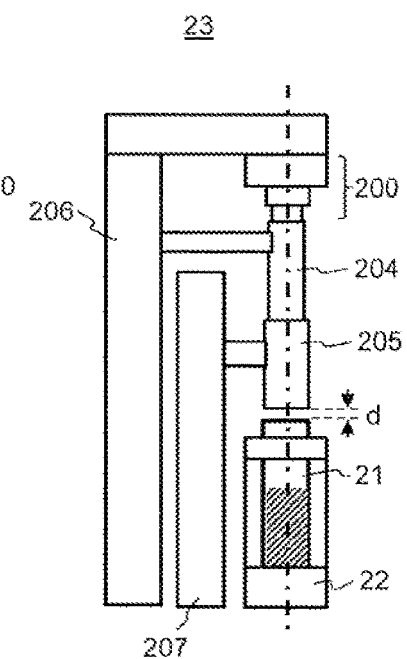

According to the configuration of the liquid level sensing mechanism 23 described above, for liquid level sensing in the long blood collection tube 21, the position of the second sound wave guide 205 is raised as illustrated in FIG. 2(a) to shorten the total length of the extendable sound wave guide. When sensing the liquid level in the short blood collection tube 21, the second sound wave guide 205 is lowered as illustrated in FIG. 2(b) to lengthen the total length of the extendable sound wave guide. By the above motion, the distance d between the second sound wave guide 205 and the blood collection tube 21 can be controlled to a predetermined distance (e.g., 2 mm to 5 mm), and it is possible to suppress diffusion of sound waves and precisely detect the liquid level of the blood collection tube 21 having different heights and being conveyed, i.e., to measure the distance from the element section 202 to the liquid level. It is to be noted that the ultrasonic distance sensor 200, the first sound wave guide 204 and the second sound wave guide 205 of the extendable sound wave guide, and the blood collection tube 21 of the measurement target are desirably disposed coaxially for measuring the liquid level position in the blood collection tube 21. In addition, the second sound wave guide 205 desirably has a shape thinner than the inner diameter of the blood collection tube 21. If the second sound wave guide 205 is thinner than the inner diameter of the blood collection tube 21, reflection of sound waves from the edge of the blood collection tube 21 can be suppressed.

Figure 2C:
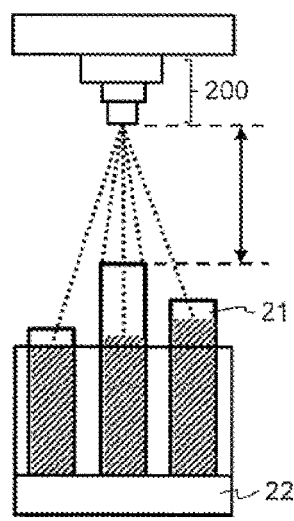

FIG. 2(c) is a schematic view illustrating a state of liquid level sensing by the conventional ultrasonic distance sensor 200 having no sound wave guide. The figure is an example of sensing the liquid level of the center blood collection tube when three blood collection tubes 21 having different heights are disposed on the conveyance rack 22. When an ultrasonic wave is transmitted downward from the ultrasonic distance sensor 200 at the upper part, a diffusion of a sound wave as illustrated by the dotted line is generated, and when the diffused sound wave collides with something, it is reflected there. Reflected waves are detected by the ultrasonic distance sensor 200, and signals corresponding to the respective reflected waves are generated. Other than those illustrated in the figure, sound waves are reflected from the conveyance rack 22 and the edge of the other blood collection tubes 21.

In the conventional ultrasonic distance sensor without a sound wave guide, as described above, the ultrasonic distance sensor is provided with a dead region where reflected waves are ignored. For example, as illustrated by an arrow in FIG. 2(c), a time zone in which a reflected wave returns from a space from the top surface of the highest blood collection tube 21 to the ultrasonic distance sensor 200 is defined as a dead region. In this case, when the liquid level of the right and left blood collection tubes 21 is higher than the liquid level of the center blood collection tube of the measurement target, the reflection of the sound wave first returns from there. In addition, the sound wave also returns from the edge of the blood collection tube.

Figure 3A:
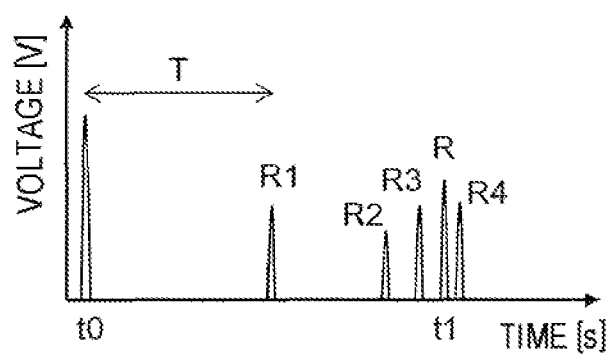
FIGS. 3A and 3B are schematic views illustrating an example of a signal waveform obtained from an ultrasonic distance sensor.
Figure 3B:
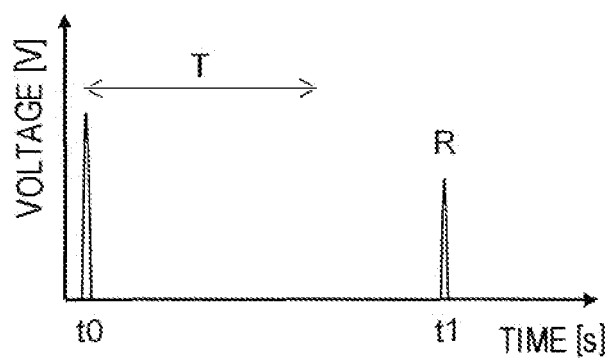

FIG. 3 is a schematic view illustrating an example of a signal waveform obtained from the ultrasonic distance sensor, FIG. 3(a) illustrates a signal waveform by the ultrasonic distance sensor of a conventional liquid level sensing analyzer having no sound wave guide, and FIG. 3(b) illustrates a signal waveform by the ultrasonic distance sensor of the liquid level sensing mechanism having the extendable sound wave guide of the present embodiment.

In the conventional liquid level sensing analyzer illustrated in FIG. 2(c), ultrasonic waves are diffused and transmitted, and hence they are reflected at various locations in the analyzer and detected by the ultrasonic distance sensor. As a result, as illustrated in FIG. 3(a), after the ultrasonic wave is transmitted at a time t0, a detection signal R by the reflected wave from the liquid level of the blood collection tube of the measurement target is output at a time t1, and besides, detection signals R1 to R4 based on a plurality of reflected waves are output. For example, R1 is a detection signal based on a reflected wave from the upper edge of the blood collection tube of the measurement target, R2 is a detection signal based on a reflected wave from the liquid level of the right adjacent blood collection tube, R3 is a detection signal based on a reflected wave from the top surface of the conveyance rack, and R4 is a detection signal based on a reflected wave from the liquid level of the left adjacent blood collection tube. Even if the time region corresponding to the distance from the top surface of the highest blood collection tube 21 to the ultrasonic distance sensor 200 illustrated by the arrow in FIG. 2(c) is set as a dead region T, the detection signals R2 to R4 based on the reflected waves cannot be removed.

On the other hand, in the liquid level sensing mechanism of the present embodiment, the directivity of sound waves is enhanced by using the sound wave guide, and ultrasonic waves are guided from the ultrasonic distance sensor 200 to a position immediately above the blood collection tube 21 of the measurement target or to inside of the blood collection tube of the measurement target by extending and contracting the sound wave guide in accordance with the height of the blood collection tube. Therefore, it is possible to avoid as much as possible the occurrence of a reflected wave from a location other than the liquid level to be measured. As a result, as illustrated in FIG. 3(b), after the voltage is applied to the piezoelectric element at the time t0 and a ultrasonic wave is transmitted, the reflected wave from the liquid level is received at the time t1 and the detection signal R is output, but the reflected wave that becomes noise is hardly detected during this time. The reflected wave that becomes noise is not detected similarly in liquid level position measurement of a blood collection tube having a long tube length and in liquid level position measurement of a blood collection tube having a short tube length, and the liquid level position in the blood collection tube can be measured with high precision in either case.

In a case of the liquid level sensing mechanism of the present embodiment, the reflected wave from the liquid level is not detected in a time zone when the sound wave transmitted from the piezoelectric element of the ultrasonic distance sensor 200 passes through the sound wave guide. Accordingly, as illustrated in FIG. 3(b), this time zone may be set as the dead region T. When the length of the sound wave guide changes by extending and contracting the sound wave guide, the dead region is only required to be switched accordingly.

Thus, in the liquid level position measurement of the blood collection tube 21 handled by the automatic blood analyzer 10, there are a plurality of adjacent blood collection tubes 21, and the liquid level position has a wide range, and it is hence difficult to set the dead region. Therefore, it is effective to adopt a configuration in which the sound wave is physically shielded between the blood collection tube 21 and the ultrasonic distance sensor 200.

Next, the second embodiment of the liquid level sensing mechanism is described. In the present embodiment, a plurality of sound wave guides having different lengths is prepared in advance as the sound wave guides. Then, one appropriate sound wave guide is selected from the plurality of sound wave guides having different lengths by a sound wave guide exchange mechanism in accordance with the height of the blood collection tube that is conveyed, and is disposed between the blood collection tube and the ultrasonic distance sensor.

As the sound wave guide exchange mechanism, as an example, a robot mechanism can be used. In this case, the plurality of sound wave guides having different lengths is stored in a sound wave guide storage unit provided in the liquid level sensing mechanism 23, and an appropriate sound wave guide is grasped and taken out from them by the robot mechanism. The robot mechanism disposes the taken out sound wave guide between the blood collection tube and the ultrasonic distance sensor, and measures the liquid level position in the blood collection tube by the ultrasonic distance sensor in that state. Next, if the blood collection tube whose liquid level position is measured is at the same height, the same sound wave guide is used as it is, and if the height is different, the robot mechanism, after returning the used sound wave guide to the sound wave guide storage unit, grasps the appropriate sound wave guide, disposes it between the blood collection tube and the ultrasonic distance sensor, and performs measurement. As another example of the sound wave guide exchange mechanism, a rotary exchange type sound wave guide having a rotary disk can be used. In this case, by fixing the plurality of sound wave guides having different lengths around the rotary disk, and rotating the rotary disk in accordance with the height of the blood collection tube that is conveyed, a desired sound wave guide is selectively disposed between the blood collection tube and the ultrasonic distance sensor.

Figure 4A:
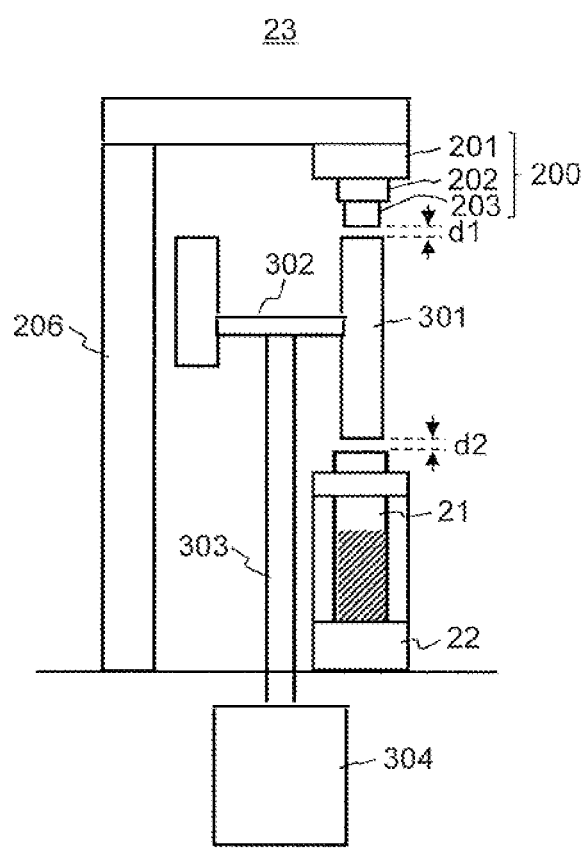
FIGS. 4A and 4B are schematic views illustrating a second embodiment of the liquid level sensing mechanism.
Figure 4B:
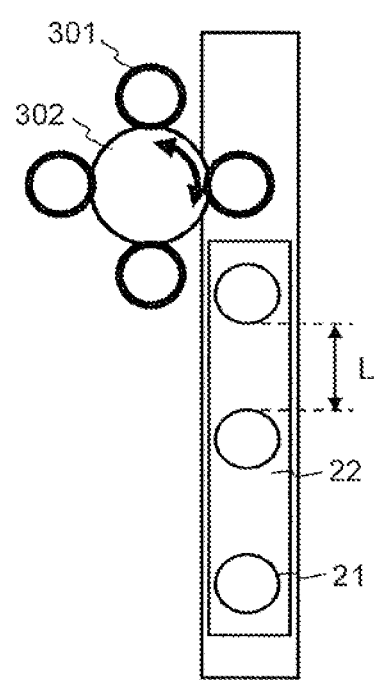

FIG. 4 is a schematic view illustrating an example of a liquid level sensing mechanism using a rotary exchange type sound wave guide. FIG. 4(a) is a schematic side view of the conveyance rack viewed from the travel direction thereof, and FIG. 4(b) is a schematic top view of the conveyance rack. However, in FIG. 4(b), the ultrasonic distance sensor and the base are not illustrated. When the sound wave guide exchange mechanism is configured with a rotary disk, the mechanism system becomes simpler than that when configured with a robot mechanism, and low cost, space saving, and high reliability can be realized.

The configuration of the ultrasonic distance sensor 200 and the base 206 is the same as that of the first embodiment, and the ultrasonic distance sensor 200 is fixed to the base 206. The present embodiment is different from the first embodiment in the configuration of a sound wave guide 301 provided between the blood collection tube 21 and the ultrasonic distance sensor 200. In the example of FIG. 4, a plurality of sound wave guides 301 having different heights is fixed around a rotary disk 302. The sound wave guides 301 having different heights are disposed in order of height. The rotary disk 302 is supported by a rotary shaft 303 extending from below, and the rotary shaft 303 is connected to a rotary actuator 304. With the above configuration, the rotary disk 302 provided with the plurality of sound wave guides 301 can rotate by the motion of the rotary actuator 304. In the liquid level sensing mechanism 23 of this configuration, a gap d1 is provided between the ultrasonic distance sensor 200 and the sound wave guide 301, and a gap d2 is provided between the sound wave guide 301 and the blood collection tube 21. Both the gap d1 and the gap d2 are desirably small values, and are desirably 5 mm or less. Even when the sound wave guide 301 rotates by the driving of the rotary actuator 304 by the gap d1 and the gap d2, it can rotate without coming into contact with the ultrasonic distance sensor 200 and the blood collection tube 21.

In the liquid level sensing mechanism 23 of the present embodiment, the rotary disk 302 rotates in accordance with the height of the blood collection tube 21 that is conveyed, and the sound wave guide 301 disposed between the ultrasonic distance sensor 200 and the blood collection tube 21 is switched, thereby measuring the liquid level position. The diffusion of sound waves generated between the ultrasonic distance sensor 200 and the blood collection tube 21 is suppressed by switching the sound wave guides 301. Therefore, it is necessary to switch to the sound wave guide 301 suitable for the distance between the ultrasonic distance sensor 200 and the blood collection tube 21 for the blood collection tubes 21 having different heights to be conveyed. A desirable condition is that, as mentioned above, the gap d2 between the blood collection tube 21 and the sound wave guide 301 is 5 mm or less. Therefore, it is necessary to determine and prepare the type of the sound wave guides 301 having different lengths in advance in accordance with the type of the blood collection tubes 31 used in the automatic blood analyzer 10. In addition, a distance L between the adjacent blood collection tubes 21 on the conveyance rack 22 is set to a distance so as not to fall within the rotation radius of the sound wave guide 301 in order to avoid contact of the sound wave guide 301 in a rotation motion. That is, when the sound wave guide 301 is exchanged in accordance with the height of the blood collection tube, it is necessary to provide an interval that is sufficient to allow the rotary disk on which the sound wave guide is fixed to freely rotate.

According to the liquid level sensing mechanism of the present embodiment, the sound wave guides 301 having lengths sufficient to fill the space between the ultrasonic distance sensor 200 and the blood collection tube 21 are disposed therebetween in a switching manner in accordance with the blood collection tubes 21 having different heights. This suppresses the sound wave from diffusing between the ultrasonic distance sensor 200 and the blood collection tube 21, and does not cause the reflected wave that becomes noise to be generated, and whereby the liquid level position in the blood collection tube 21 can be precisely measured. As compared with the first embodiment, the second embodiment can be realized with a simple configuration capable of directly transmitting the drive of the rotary actuator 304. In addition, since the ultrasonic distance sensor 200 is fixed and only the sound wave guide 301 moves, and the movable section of the sound wave guide and the ultrasonic distance sensor are not brought into contact with each other, it is possible to reduce the influence of a positioning error and vibration noise that are due to position adjustment.

Figure 5:
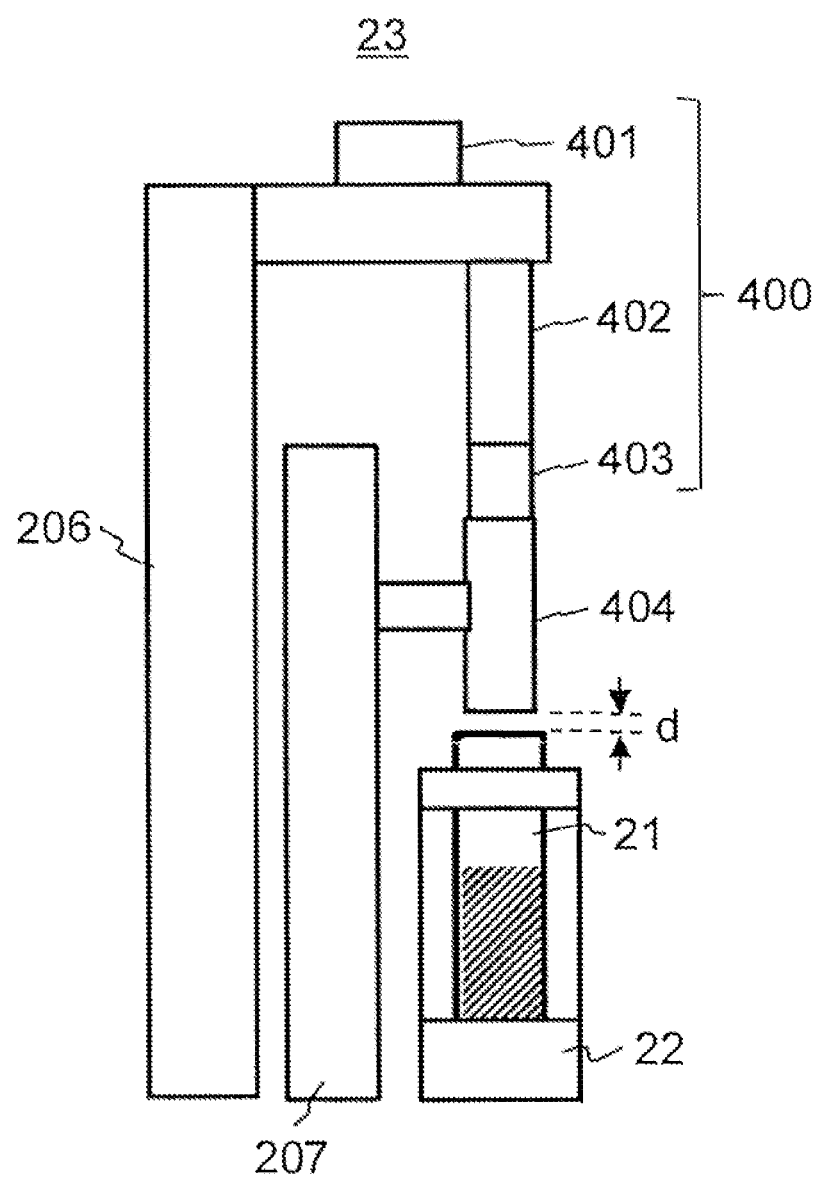
FIG. 5 is a schematic view illustrating a third embodiment of the liquid level sensing mechanism.

FIG. 5 is a schematic view illustrating the third embodiment of the liquid level sensing mechanism. The present embodiment is a configuration example of a liquid level sensing mechanism using a sensor peripheral vertical type sound wave guide. An ultrasonic distance sensor 400 of the liquid level sensing mechanism 23 of the present embodiment has a shape different from that of the ultrasonic distance sensor 200 of the first and second embodiments. A signal processing unit 401 is disposed at a position away from an element section 402, and the element section 402 and a cylindrical section 403 each have an elongated columnar outer shape and a diameter that is smaller than that of a sound wave guide 404. The sound wave guide 404 has a cylindrical shape similar to the configuration illustrated in FIG. 2, has an inner diameter larger than the outer diameter of the ultrasonic distance sensor, and is vertically movable surrounding the ultrasonic distance sensor by the vertical mechanism 207.

In the liquid level sensing mechanism 23 of the present embodiment, it is possible to vertically move the sound wave guide 404 without coming into contact with the ultrasonic distance sensor 400. Therefore, by vertically moving the sound wave guide 404 in accordance with the height of the blood collection tube 21, it is possible to adjust a gap d between the ultrasonic distance sensor 400 and the blood collection tube 21 to be 5 mm or less. Accordingly, the diffusion of the sound wave from the ultrasonic distance sensor 400 can be suppressed when the liquid level in the blood collection tube 21 is sensed, and the liquid level position can be precisely measured. Besides, also in the present embodiment, it is possible to obtain the same effects as in the other embodiments described above.

Here, the signal processing unit 401 may be formed into a cylindrical shape and disposed so as to be directly connected to the element section 402. Furthermore, although the cylindrical section 403 is provided to secure the movable region of the sound wave guide 404, it may be unnecessary if the movable region of the sound wave guide 404 can be secured by increasing the length of the element section 402 or providing a cylindrical coupling section between the element section 402 and the base 206. That is, the length of the sound wave guide 404 is only required to be such that the sound wave guide 404 does not come into contact with the base 206 or the like even if the sound wave guide 404 moves upward when the long blood collection tube 21 is conveyed, and the length of the element section 402 or a combined length of the element section 402 and the cylindrical section 403 becomes the movable region of the sound wave guide 404.

Figure 6:
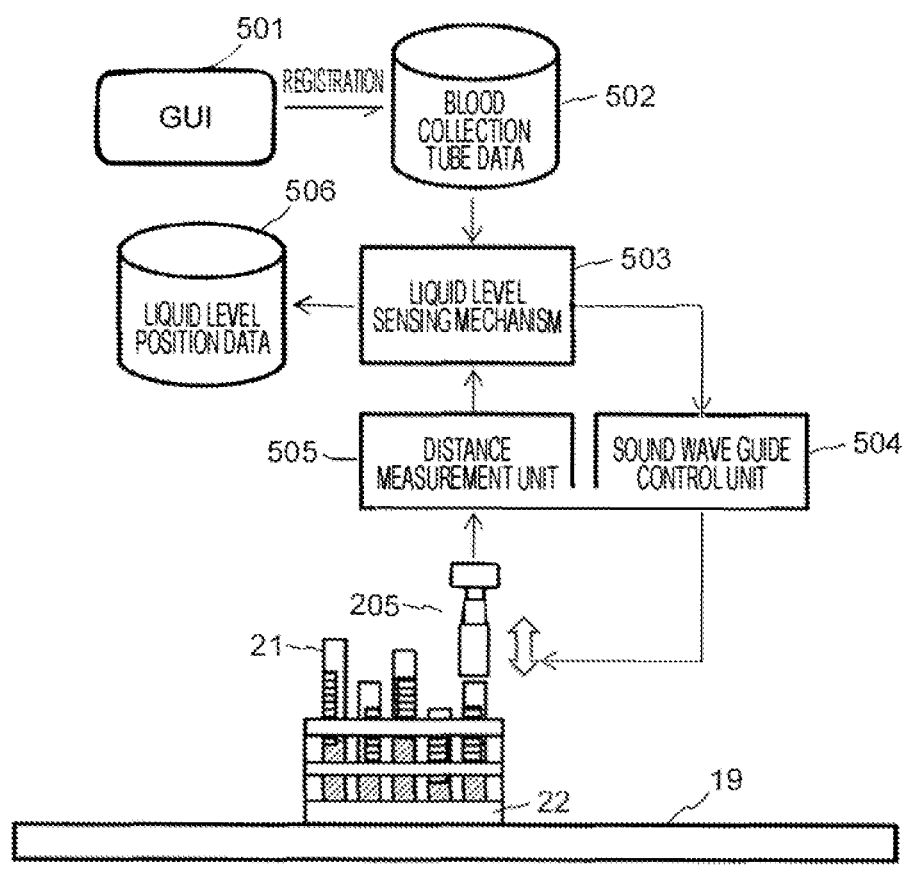
FIG. 6 is a schematic view illustrating a configuration example of a liquid level sensing system.

FIG. 6 is a schematic view illustrating a configuration example of a liquid level sensing system. The control unit of the automatic blood analyzer 10 has a GUI 501 that receives an operation from a user. Height information of the blood collection tube 21 registered by the user and height information of the standard blood collection tube 21 are stored in blood collection tube data 502. The location where the blood collection tube data 502 is stored is a storage unit where the height information of the blood collection tube is registered in advance. In addition, in the blood collection tube data 502, the bar code ID affixed to the blood collection tube 21 can be associated with the height information (may include information on the outer diameter and the inner diameter) of the blood collection tube 21. Therefore, the user selects the type (height) of the blood collection tube 21 for each bar code ID with the GUI 501. Alternatively, the bar code ID and the information of the blood collection tube 21 are associated with each other in advance by transmitting the information from an upper terminal that manages the examination in the examination room or the like. The conveyance line 19 of the automatic blood analyzer 10 is provided with the bar code reader 30 that reads the bar code 29 affixed to the blood collection tube 21, and information on the height of the blood collection tube 21 can be confirmed by matching the bar code ID read from the blood collection tube 21 flowing in the conveyance line 19 with the blood collection tube data 502 registered in advance.

A liquid level sensing mechanism 503 confirms, from the blood collection tube data 502, the height information of the blood collection tube 21 that is conveyed, and controls the sound wave guide (any of 205, 301, and 404) by a sound wave guide control unit 504 in order to fill the gap between the blood collection tube 21 and the ultrasonic distance sensor (200 or 400). Controls of the sound wave guide by the sound wave guide control unit 504, for example, extension and contraction of the sound wave guide in a case of an extension and contraction type sound wave guide, switching of the sound wave guides by rotation of the rotary disk in a case of the rotary exchange type sound wave guide, and vertical motion of the sound wave guide in a case of the sensor peripheral vertical type sound wave guide are executed when the blood collection tube of the measurement target is positioned below the ultrasonic distance sensor. After the distance between at least the sound wave guide and the blood collection tube is made to be a certain value or less by the control of the sound wave guide, a distance measurement unit 505 measures the time when the sound wave transmitted from the ultrasonic distance sensor is reflected from the liquid level, and measures the liquid level position in the blood collection tube 21. The measured liquid level position information is stored in liquid level position data 506 and used for control of the sample dispensation mechanism 15. It is to be noted that the processing of switching the dead region T of the ultrasonic distance sensor in accordance with the length of the sound wave guide described in FIG. 3(*b*) can be executed by a program implemented on the liquid level sensing mechanism 503, for example.

In the present embodiment, before measuring the liquid level position of the blood collection tube 21 mounted on the conveyance rack 22 flowing in the conveyance line 19, the height information of the blood collection tube 21 is confirmed, and the drive control of the sound wave guide is performed. Although the example of measuring each blood collection tube 21 is illustrated here, a configuration of simultaneously measuring a plurality of blood collection tubes is also possible. For example, when five blood collection tubes are mounted on the conveyance rack 22, a plurality of ultrasonic distance sensors and sound wave guides may be arranged. In this case, the respective sound wave guides are driven and controlled by the sound wave guide control unit 504 in accordance with the height of the blood collection tubes 21 that the respective sound wave guides target. In addition, it is also possible to simplify the control of the sound wave guide by setting a limit on the height of the blood collection tube 21 mounted on one conveyance rack 22 in operation and mounting only the blood collection tube 21 of the same height on one conveyance rack 22. In this case, since the sound wave guide is controlled not in units of blood collection tubes but in units of conveyance racks, the conveyance time can be shortened.

Figure 7:
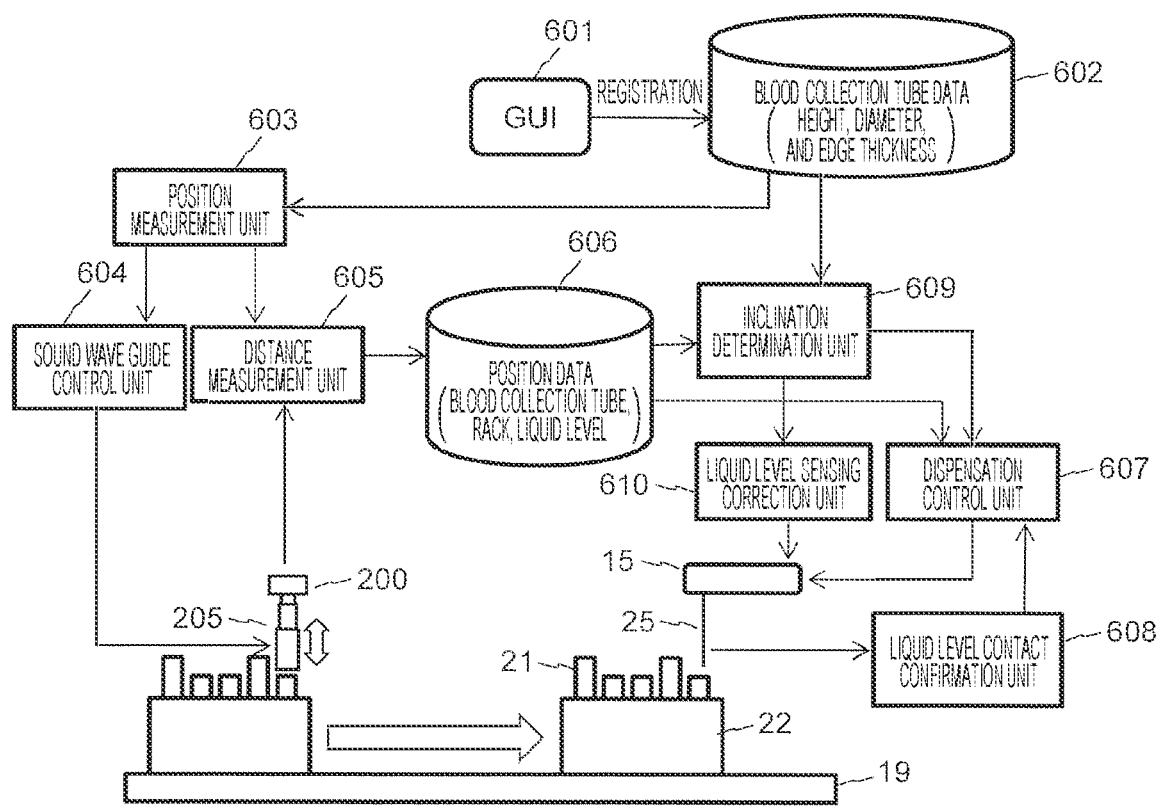
FIG. 7 is a schematic view illustrating a configuration example of the liquid level sensing system.

FIG. 7 is a schematic view illustrating a configuration example of the liquid level sensing system to which a control unit for inclination determination of the blood collection tube and a dispensation mechanism is added. From a GUI 601, the user can register, into blood collection tube data 602, various data (not only height but also shape information such as inner diameter, outer diameter, and edge thickness) of the blood collection tube 21, and shape data of the standard blood collection tube is registered in advance in the blood collection tube data 602. Similar to the liquid level sensing system of FIG. 6, the association between the bar code ID affixed to the blood collection tube 21 and the data of the blood collection tube 21 is also performed with the blood collection tube data 602.

The liquid level sensing system illustrated in FIG. 7 can measure not only the liquid level position of the blood collection tube 21 but also the inclination of the blood collection tube 21. A position measurement unit 603 can give an instruction to each of a sound wave guide control unit 604 and a distance measurement unit 605, and control the sound wave guide (any of 205, 301, and 404) and the ultrasonic distance sensor (200 or 400). The position measurement unit 603 recognizes the position of the conveyance rack 22 conveyed by the conveyance line 19, and when measuring the liquid level position in the blood collection tube 21, drives and controls the sound wave guide as described above so that the gap between the ultrasonic distance sensor and the blood collection tube becomes small. Furthermore, the position measurement unit 603 measures the height of the edge of the blood collection tube 21 and the height of the top surface of the conveyance rack 22. For example, at the timing when the edge of the blood collection tube 21 moves under the ultrasonic distance sensor 200, the control of raising or rotating the sound wave guide is performed so that the ultrasonic distance sensor 200 can recognize the edge of the blood collection tube 21. Similarly, at the timing when the top surface of the conveyance rack 22 moves under the ultrasonic distance sensor, the control of lowering the sound wave guide is performed. It is to be noted that since the top surface of the conveyance rack 22 has a large area, it can be sensed even without the sound wave guide. As described above, the liquid level sensing system illustrated in FIG. 7 is capable of measuring the liquid level in the blood collection tube 21, the height of the upper edge of the blood collection tube 21, and the position of the top surface of the conveyance rack 22.

It is to be noted that the position measurement unit 603 can recognize the position of the conveyance rack 22 on the conveyance line 19 by controlling by itself the conveyance line 19 or by communicating with a control unit that controls the conveyance line 19. Furthermore, it is desirable to add a control of switching the dead band (region not to be measured) of the ultrasonic distance sensor in accordance with the length of the sound wave guide. The height information of the edge of the blood collection tube 21 measured by the method described above is at least at two points, e.g., the height information of both ends in the travel direction of each of the blood collection tubes 21 in FIG. 7.

The pieces of information regarding the liquid level position in the blood collection tube 21 having been measured, the height of the edge of the blood collection tube 21, and the height of the conveyance rack 22 are recorded in position data 606.

After the measurement by the ultrasonic distance sensor (200 or 400), the conveyance rack 22 is conveyed by the conveyance motion of the conveyance line 19 to the position where the sample dispensation mechanism 15 performs the sample dispensation. At the sample dispensation position, as described above, the nozzle 25 of the sample dispensation mechanism 15 is stopped at a liquid level suction position in the blood collection tube 21. That is, in order to suck the liquid, the tip is stopped at a position several millimeters lower than the liquid level. At this time, since the liquid level position has already been measured by the liquid level sensing mechanism using the ultrasonic distance sensor and recorded in the position data 606, the deceleration in the lowering motion of the nozzle 25 can be performed at any timing. The position control of the sample dispensation mechanism 15 is performed by a dispensation control unit 607. For example, since the nozzle 25 of the sample dispensation mechanism 15 vibrates at the natural frequency of the mechanism when lowering, the dispensation control unit 607 can adjust the motion parameters such as the deceleration time and deceleration timing so as to cancel the vibration of the sample dispensation mechanism 15. The adjustment of the operation parameters can be performed before lowering the nozzle 25 or during the lowering motion by a control program implemented on the dispensation control unit 607, for example. In addition, as described above, the nozzle 25 of the sample dispensation mechanism 15 is provided with a contact-type capacitive sensor, and a liquid level contact confirmation unit 608 can confirm that the nozzle is in contact with the liquid.

However, if the blood collection tube 21 is inclined, the liquid level contact confirmation unit 608 may cause false sensing. The factor of occurrence of false sensing is that the nozzle 25 approaches the blood collection tube 21 charged with static electricity, and false sensing can be avoided if the inclination of the blood collection tube 21 is known. Therefore, the liquid level sensing system of the present embodiment includes an inclination determination unit 609 of the blood collection tube. The inclination determination unit 609 reads the height information of the upper edge of the blood collection tube 21 at two or more points from the position data 606, and determines the inclination of the blood collection tube. In determination of the inclination, the following three types of determination are performed from the height information at two points (desirably both ends) of the upper edge of the blood collection tube.

(a) Normal (heights of two points are identical and normal values)
(b) Inclined relative to the travel direction of the conveyance line 19 (heights of two points are different)
(c) Inclined relative to the right-left direction of the conveyance line 19 (heights of two points are each higher than the normal value).

It is to be noted that in the determination of (a) and (c) above, the heights of the two points are also compared with the height from the top surface of the rack. When the heights of the two points from the top surface of the rack are specified values, the height is determined to have a normal value.

Other than the determination method described above, the inclination may be determined on the basis of the measurement data of a plurality of points by performing a line trace. In addition, also using the information on the top surface position of the conveyance rack 22, it may be judged as to whether or not the blood collection tube 21 is higher than the normal position, i.e., in a floating state.

Using the inclination determination unit 609 of the blood collection tube 21 described above, it is possible to add control of avoiding false sensing by a liquid level sensing correction unit 610 during the lowering motion of the nozzle 25 that senses contact of the liquid level. The processing contents of the liquid level sensing correction unit 610 is described later.

In the liquid level sensing system having the above configuration, the liquid level position is measured with the liquid level sensing mechanism 23 using the ultrasonic distance sensor with respect to the blood collection tube 21 conveyed by the conveyance line 19 first. Subsequently, when the blood collection tube 21 is conveyed to the sample dispensation mechanism 15, the lowering motion of the nozzle is performed in an optimized motion, i.e., in a motion pattern capable of suppressing vibration. Then, the contact with the liquid is confirmed by the liquid level contact confirmation unit 608, and reliable and highly precise liquid suction is realized. It is to be noted that the liquid level sensing function can be used without the inclination determination unit 609 and the liquid level sensing correction unit 610. By adding the inclination determination unit 609 and the liquid level sensing correction unit 610, false sensing of the contact-type liquid level sensing mechanism can be reduced, and a more reliable system can be realized.

In addition, if the result of measurement by the liquid level sensing mechanism using the ultrasonic distance sensor (position data 606) and the result of confirmation by the contact-type liquid level contact confirmation unit 608 (lowering amount of the nozzle 25) are different from each other, either of detection data has an error, and use of the inclination determination unit 609 allows the risk of false sensing by the contact-type liquid level contact confirmation unit to be confirmed or recorded.

Figure 8:
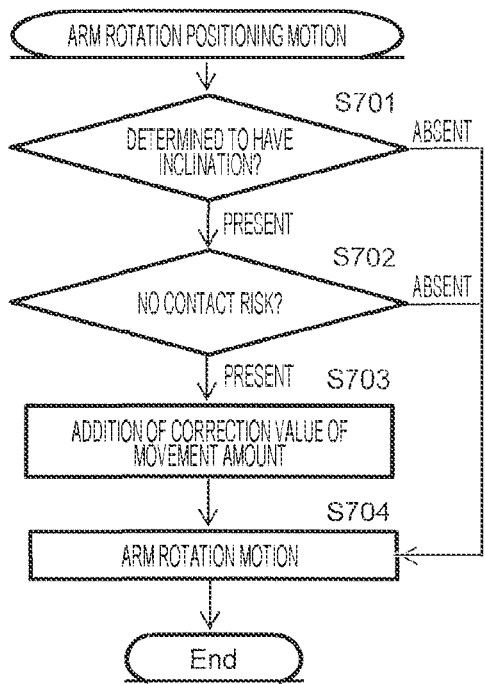
FIGS. 8A and 8B are views illustrating an example of a processing flow of the liquid level sensing system.
Figure 8:
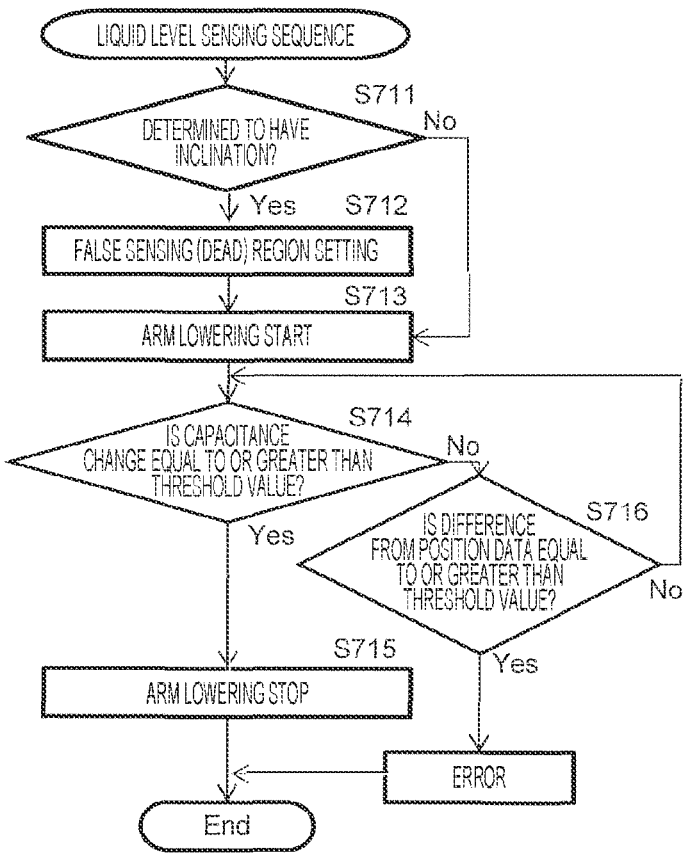

FIG. 8 is a view illustrating an example of the processing flow of the liquid level sensing system. Here, an example of a motion correction method and an arm lowering method of the sample dispensation mechanism 15 using the inclination determination unit 609 is described. As described above, in some cases, the blood collection tube 21 is inclined with respect to the conveyance rack 22. If the nozzle 25 is lowered to the blood collection tube 21 in such a state, there is a risk of not only false sensing of the contact-type liquid level sensing but also contact between the edge or side surface of the blood collection tube 21 and the nozzle 25. Therefore, in the control of the sample dispensation mechanism 15 of the present embodiment, the contact between the nozzle 25 and the blood collection tube 21 is avoided by using the inclination determination unit 609.

FIG. 8(*a*) is a view illustrating an example of a control flow when the arm is moved horizontally so that the sample dispensation mechanism 15 sucks the sample from the blood collection tube 21. As described above, the sample dispensation mechanism 15 performs positioning of the nozzle 25 between the reaction cell 26 of the reaction disk 13 and the suction position of the blood collection tube 21 by the rotation motion of the arm. However, when the blood collection tube 21 has a large inclination, there is a risk that the lowered nozzle 25 comes into contact with the blood collection tube 21. The sample dispensation mechanism 15 has a sensor (switch) for sensing that the nozzle 25 is in abnormal contact, but if the nozzle is in abnormal contact, the analyzer stops. Therefore, it is desirable to avoid the contact risk as much as possible.

The control flow of the sample dispensation mechanism 15 of the present embodiment has processing (S701) where the inclination determination unit 609 judges whether or not the blood collection tube is inclined. If there is an inclination, the flow of processing proceeds to processing (S702) of determining the contact risk between the nozzle 25 and the blood collection tube 21, where the diameter of an opening of the blood collection tube 21 is read from the blood collection tube data 602 and the measured liquid level is read from the position data 606, and it is judged whether or not the distance in which the nozzle 25 gets closest to the blood collection tube 21 during the lowering motion of the nozzle 25 is equal to or less than a preset value. Since the nozzle 25 is elongated and easily vibrates, it is desirably separated at least a few millimeters away from the tube wall of the blood collection tube 21. The processing of determining the contact risk can be executed by a program implemented in the inclination determination unit 609, for example. If it is determined that there is a contact risk, a correction value is added to the horizontal movement amount of the nozzle by the arm rotation motion (S703), and then the arm rotation motion is performed (S704), thereby allowing contact with the blood collection tube 21 to be avoided. The processing of adding the correction value to the horizontal movement amount of the nozzle can be executed by a dispensation control program implemented in the dispensation control unit 607, for example.

Figure 9:
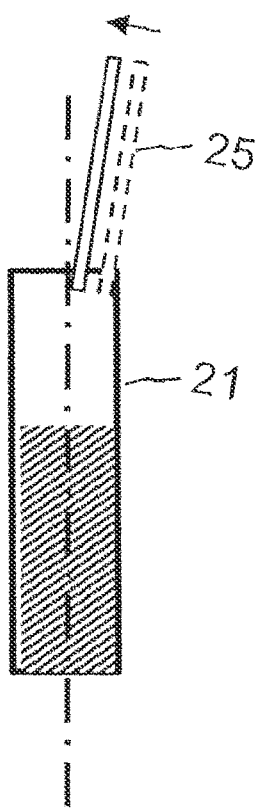
FIG. 9 is a schematic view illustrating a state of horizontal movement amount correction of a nozzle.

FIG. 9 is a schematic view illustrating a state of horizontal movement amount correction of the nozzle. In this example, it was determined that the blood collection tube 21 was inclined and there was a risk that the nozzle 25 would come into contact with the blood collection tube in the normal arm rotation motion, as indicated by the broken line. Therefore, the nozzle 25 is moved to the solid line position by adding the correction indicated by the arrow to the horizontal movement amount of the nozzle by the normal arm rotation motion, thereby lowering the nozzle 25 into the blood collection tube 21 without bringing into contact with the blood collection tube 21, and sucking the sample. In the above processing, if the blood collection tube 21 has no inclination, the normal arm rotation is performed. It is to be noted that it also possible to stop with an alarm without adding a correction value after it is determined that there is a contact risk in the determination of whether or not there is a contact risk (S702).

While an example has been described here in which the horizontal movement of the nozzle 25 is performed by the rotation of the arm to which the nozzle is fixed, the horizontal movement of the nozzle may be performed by a combination of the rotation of the arm and the extension and contraction of the arm depending on the configuration of the dispensation mechanism. Alternatively, a drive method may be used in which the nozzle is horizontally moved to any position by two linear movement mechanisms that linearly move in directions orthogonal to each other.

Figure 10:
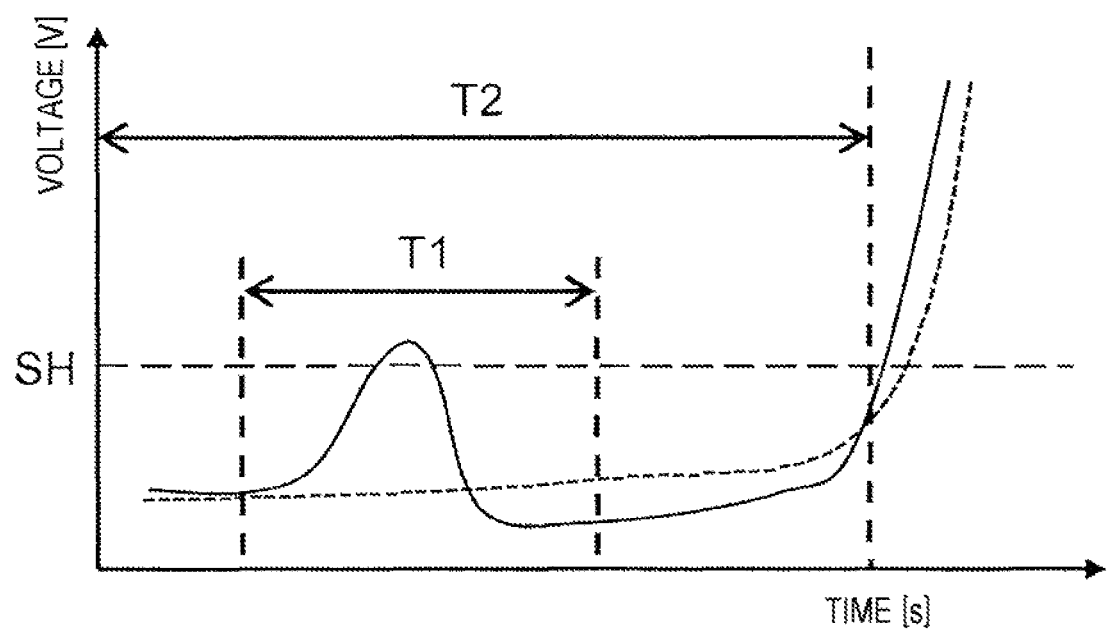
FIG. 10 is a schematic view illustrating an example of an output of a capacitive sensor and dead region setting.

FIG. 8(b) is a view illustrating an example of a control flow of an arm lowering motion. An inclination of the blood collection tube 21 is confirmed by the inclination determination unit 609 (S711), and if there is an inclination, the position where the nozzle 25 approaches the blood collection tube 21 is set as a dead region of the sensor (S712). FIG. 10 is a schematic view illustrating an example of an output of the capacitive sensor and dead region setting. In the figure, the broken line represents an output waveform of the capacitive sensor in a case where the blood collection tube has no inclination, and the solid line represents an output waveform of the capacitive sensor in a case where the blood collection tube has an inclination. If the blood collection tube is inclined, as illustrated in FIG. 9, when lowering the nozzle 25 of the sample dispensation mechanism 15, the nozzle does not pass through the center of the upper opening of the blood collection tube but approaches one edge, and the output of the capacitive sensor exceeds a liquid level sensing threshold value SH, thereby causing false sensing. Therefore, as illustrated in FIG. 10, a time zone in which the nozzle 25 approaches the upper edge of the blood collection tube is set as a dead region T1. The setting of the dead region T1 can be executed by a liquid level sensing correction program implemented in the liquid level sensing correction unit 610, for example. With this setting, the capacitance that changes as the nozzle 25 approaches the blood collection tube 21 is ignored. However, since the liquid level position is stored in the position data 606, the entire region several millimeters above the liquid level position may be set as a dead region T2.

After the setting of the dead region, arm lowering start processing is performed (S713), and the capacitance changes as the nozzle 25 approaches the liquid level. Contact of the liquid level is sensed by a determination (S714) that the change in the capacitance becomes equal to or greater than a threshold value, and if the contact with the liquid is sensed by the determination, the arm lowering is stopped (S715). By performing the above motion, it is possible to reliably stop the nozzle 25 even if erroneous information is included in the liquid level position in the position data 606. Furthermore, error processing may be performed if a difference occurs by comparing (S716) the liquid level position data of the position data 606 with the position where the capacitance change exceeds the threshold value. In this case, there is an error in either the liquid level position measured by the liquid level sensing mechanism 23 using the ultrasonic distance sensor or the liquid level position sensed by the contact-type liquid level contact confirmation unit 608 using the capacitive sensor. As described above, since the inclination information of the blood collection tube 21 can also be recorded, a message for the user regarding modification of the inclination of a certain value or more may be displayed on the GUI or the like.

In the present embodiment, an example of measuring the blood collection tube on a one-by-one basis has been given. However, it is also possible to simultaneously measure the liquid level of a plurality of blood collection tubes by disposing a plurality of the sound wave guides and ultrasonic distance sensors mentioned earlier. Furthermore, while in the present embodiment, the sample dispensation of the automatic blood analyzer has been described as an example, the liquid level sensing mechanism of the present invention can also be used similarly in a reagent container and another dispensation nozzle such as a reagent dispensation nozzle.

It is to be noted that the present invention is not limited to the embodiments described above, and includes various modifications. For example, the embodiments described above have been described in detail for the purpose of explaining the present invention in an easy-to-understand manner, and are not necessarily limited to those having all the configurations described above. It is also possible to replace part of the configuration of one embodiment with the configuration of another embodiment, and it is also possible to add the configuration of another embodiment to the configuration of one embodiment. Furthermore, another configuration can be added to, deleted from, or replaced with part of the configuration of each embodiment.

Furthermore, each of the configurations, functions, processing units, processing means, and the like described above may partially or entirely be realized in hardware by designing them in an integrated circuit, for example. Furthermore, each of the configurations, functions, and the like described above may be realized in software by the processor interpreting and executing a program that implements each of the functions. Information such as programs, tables, and files that implement each of the functions can be stored in a recording device such as a memory, a hard disk, and a solid state drive (SSD), or a recording medium such as an IC card, an SD card, and a DVD.

REFERENCE SIGNS LIST 11 reagent container
12 reagent disk
13 reaction disk
14 reagent dispensation mechanism
15 sample dispensation mechanism 21 blood collection tube
22 conveyance rack
23 liquid level sensing mechanism
25 nozzle
200 ultrasonic distance sensor
204 first sound wave guide
205 second sound wave guide
206 base
207 vertical mechanism
301 sound wave guide
302 rotary disk
303 rotary shaft
304 rotary actuator
400 ultrasonic distance sensor
404 sound wave guide

The invention claimed is:

1. An automatic analyzer, comprising:
a conveyance rack for conveying a sample container which contains a sample and is loaded thereon;
a fixed ultrasonic distance sensor for measuring a liquid level position in the sample container loaded on the conveyance rack;
a sound wave guide for suppressing diffusion of sound waves transmitted from the ultrasonic distance sensor, the sound wave guide being disposed between the sample container and the ultrasonic distance sensor; and
a sound wave guide control unit for adjusting a length or switching a length of the sound wave guide in accordance with a distance between the ultrasonic distance sensor and the sample container; and
a plurality of sound wave guides each having a different length as the sound wave guide, wherein
the sound wave guide control unit disposes one sound wave guide selected from the plurality of sound wave guides having different lengths between the sample container and the ultrasonic distance sensor.

2. An automatic analyzer, comprising:
a conveyance rack for conveying a sample container which contains a sample and is loaded thereon;
a fixed ultrasonic distance sensor for measuring a liquid level position in the sample container loaded on the conveyance rack;
a sound wave guide for suppressing diffusion of sound waves transmitted from the ultrasonic distance sensor, the sound wave guide being disposed between the sample container and the ultrasonic distance sensor;
a sound wave guide control unit for adjusting a length or switching a length of the sound wave guide in accordance with a distance between the ultrasonic distance sensor and the sample container; and
a storage unit that registers height information of the sample container in advance, wherein
when the sample container is positioned below the ultrasonic distance sensor, the sound wave guide control unit uses height information registered in the storage unit to control the sound wave guide so that a distance between the sound wave guide and the sample container becomes equal to or less than a certain value.

3. The automatic analyzer according to claim 1, wherein the plurality of sound wave guides having different lengths are fixed to a rotary disk, and
a length of the sound wave guide disposed between the sample container and the ultrasonic distance sensor is switched by rotating the rotary disk.

4. The automatic analyzer according to claim 1, comprising an inclination determination unit that determines an inclination of the sample container from heights of at least two points of an upper edge of the sample container measured by the ultrasonic distance sensor.

5. The automatic analyzer according to claim 4, comprising:
a sample dispensation mechanism having a vertically movable nozzle, the sample dispensation mechanism for dispensing a sample from the sample container loaded on the conveyance rack, wherein
after determining an inclination of the sample container, it is determined as to whether or not there is a risk that the nozzle comes into contact with the sample container.

6. The automatic analyzer according to claim 5, wherein when it is determined that there is the risk, a horizontal movement amount of the nozzle is corrected to avoid a contact with the sample container.

7. The automatic analyzer according to claim 4, comprising:
a sample dispensation mechanism having a vertically movable nozzle, the sample dispensation mechanism for dispensing a sample from the sample container loaded on the conveyance rack; and
a capacitive sensor that senses that the nozzle comes into contact with a liquid level, wherein
a dead region of the capacitive sensor is set on a basis of an inclination of the sample container.

8. The automatic analyzer according to claim 1, comprising:
a sample dispensation mechanism having a vertically movable nozzle, the sample dispensation mechanism for dispensing a sample from the sample container loaded on the conveyance rack, wherein
a motion parameter of the sample dispensation mechanism that lowers the nozzle into the sample container is adjusted on a basis of information on a liquid level position measured by the ultrasonic distance sensor.

9. The automatic analyzer according to claim 8, comprising:
a capacitive sensor that senses that the nozzle comes into contact with a liquid level, wherein
a liquid level position measured by the ultrasonic distance sensor is compared with a liquid level position sensed by the capacitive sensor.

10. The automatic analyzer according to claim 1, wherein a dead region of the ultrasonic distance sensor is switched in accordance with a length of the sound wave guide.

11. An automatic analyzer, comprising:
a conveyance rack for conveying a sample container which contains a sample and is loaded thereon;
a fixed ultrasonic distance sensor for measuring a liquid level position in the sample container loaded on the conveyance rack;
a sound wave guide for suppressing diffusion of sound waves transmitted from the ultrasonic distance sensor, the sound wave guide being disposed between the sample container and the ultrasonic distance sensor; and
a sound wave guide control unit for adjusting a length or switching a length of the sound wave guide in accordance with a distance between the ultrasonic distance sensor and the sample container; wherein
the ultrasonic distance sensor has a columnar outer shape, and
the sound wave guide has a cylindrical shape having an inner diameter larger than an outer diameter of the ultrasonic distance sensor, and is vertically movable surrounding the ultrasonic distance sensor.

12. The automatic analyzer according to claim 2, wherein the sound wave guide is multistage and extendable.

* * * * *